United States Patent

Swift

[15] 3,691,102

[45] Sept. 12, 1972

[54] GROUP VIII METAL-TIN CATALYST AND METHOD OF MAKING SAME

[72] Inventor: Harold E. Swift, West Deer Township, Allegheny County, Pa.

[73] Assignee: Gulf Research & Development Company, Pittsburgh, Pa.

[22] Filed: May 11, 1970

[21] Appl. No.: 36,178

Related U.S. Application Data

[63] Continuation-in-part of Ser. No. 689,233, Nov. 22, 1967, Pat. No. 3,580,970, which is a continuation-in-part of Ser. No. 506,479, Nov. 5, 1965, abandoned.

[52] U.S. Cl. .................252/469, 252/458, 252/459, 252/466 J, 252/466 PT, 252/466 B, 252/472, 252/474, 252/476
[51] Int. Cl. ........B01j 11/08, B01j 11/22, B01j 11/32
[58] Field of Search..252/459, 466 J, 466 PT, 466 B, 252/472, 469; 260/683.3

[56]         References Cited

UNITED STATES PATENTS 2,861,959   11/1958   Thorn et al.................252/465
2,341,995   2/1944    Kipper...................252/459 X

*Primary Examiner*—Daniel E. Wyman
*Assistant Examiner*—W. J. Shine
*Attorney*—Meyer Neishloss, Deane E. Keith and Donald L. Rose

[57]         ABSTRACT

A Group VIII metal-tin catalyst is described in which the molar ratio of Group VIII metal to tin is about 1.7 to 15. The catalyst is prepared by heating reducible compounds of a Group VIII metal and tin in oxygen and then reducing the resulting product with hydrogen. A metallic nickel-tin composition is an example of this catalyst.

13 Claims, 5 Drawing Figures

GROUP VIII METAL-TIN CATALYST AND METHOD OF MAKING SAME

This application is a continuation-in-part of U.S. Ser. No. 689,233, filed Nov. 22, 1967, now U.S. Pat. No. 3,580,970, which is a continuation-in-part of U.S. Ser. No. 506,479, filed Nov. 5, 1965, now abandoned.

This invention relates to novel dehydrogenation catalysts comprising a Group VIII metal and tin and to a process for their preparation.

The dehydrogenation of certain cycloaliphatic ketones and alcohols, such as cyclohexanone and cyclohexanol, to produce phenol has been known for many years. It has been found that valuable hydroxyaromatic compounds can be obtained from cycloaliphatic ketones and alcohols wherein the oxygen is directly connected to a cycloaliphatic ring carbon atom by a process which comprises contracting the cycloaliphatic compound under dehydrogenation conditions with a novel catalyst comprising a Group VIII metal and tin. It has additionally been found that the selectivity of the process for the production of the desired dehydrogenation product can be directed by the addition to the catalyst of certain selected metals.

Perhaps the most valuable dehydrogenation product from cyclohexanone and cyclohexanol is phenol. The primary problem associated with the production of phenol is obtaining a conversion of the cycloaliphatic compound at a level considerably in excess of 75 percent, while simultaneously achieving a high selectivity to the desired phenol product. Both high conversions and selectivities are required for a successful operation since otherwise the phenol cannot be easily separated by distillation from unreacted cyclohexanone with which it forms a maximum boiling azeotrope at 75 percent phenol. If other methods of separation are employed, then lower conversions can be tolerated. From a commercial standpoint, it is desirable to obtain conversions of the cycloaliphatic compound well in excess of 90 percent with selectivities to phenol also well in excess of 90 percent. Additionally, adequate catalyst life is a problem faced in any catalytic process involving hydrocarbon transformations, including the dehydrogenation of cycloaliphatic ketones and alcohols.

It has now been found that an excellent catalyst having very high efficiency for the conversion of cycloaliphatic ketones and alcohols to hydroxyaromatic compounds having the same number of rings per molecule can be obtained by incorporating critical proportions of a Group VIII metal and tin in the catalyst of this invention. Furthermore, the addition of certain combinations of materials to the Group VIII metal-tin catalyst has been found to stabilize the activity of the catalyst. Additionally, a novel catalyst is provided that retains its activity over extended periods of operation and in addition is easily regenerable to essentially its original activity.

In one use of the catalyst of the invention, a cycloaliphatic ketone or alcohol or mixture thereof wherein the oxygen is directly connected to a ring carbon atom is converted to a hydroxyaromatic compound having the same number of rings as the cycloaliphatic compound by contacting the cycloaliphatic compound under dehydrogenation conditions with the catalyst which comprises a Group VIII metal, preferably nickel, or mixtures thereof and tin wherein the molar ratio of the Group VIII metal to tin is at least 1.7:1.

In one embodiment of this invention the catalyst comprises a Group VIII metal and tin, wherein the molar ratio of the Group VIII metal to tin is at least 1.7:1, an alkali metal sulfate, and chromium, mostly in the form of its oxide.

In another embodiment of this invention, the catalyst comprises a Group VIII iron group metal and tin, wherein the molar ratio of the Group VIII iron group metal to tin is at least 1.7:1, an alkali metal sulfate, chromium, mostly in the form of its oxide, and a noble metal.

In yet another embodiment of this invention, the tin-Group VIII metal catalyst which is especially active for the dehydrogenation of cycloaliphatic ketones and alcohols is produced by a process which comprises heating a solid intimate admixture of a tin compound and at least one Group VIII metal compound wherein the molar ratio, calculated as the metal, of Group VIII metal to tin is at least 1.7:1 to a temperature between 250° and 600° C. for a time of at least 5 hours in the presence of a gas-containing free molecular oxygen resulting in a solid intimate mixture of the metal oxides. This oxide mixture is then reduced to the metals in hydrogen gas at an elevated temperature.

The dehydrogenation charge stock can be any cycloaliphatic ketone or alcohol wherein the oxygen is directly connected to a ring carbon atom. The cycloaliphatic compound can be mononuclear or polynuclear, containing from one to four rings, in which the ring to which the oxygen atom is attached is at least partially saturated. These cycloaliphatic ketones and alcohols include those compounds which contain from one to three oxygen atoms each of which is directly connected to a ring carbon atom. The preferred cycloaliphatic compounds are the mononuclear naphthenic type compounds of the general formula $CnH_2n$, where $n$ is the integer 5 or 6. The especially preferred charge stock is cyclohexanone, cyclohexanol, and mixtures of the two. The ring compounds can have one or more groups attached to the ring which do not interfere with the dehydrogenation reaction, such as lower alkyl having from one to four carbon atoms, phenyl, benzyl, tolyl, xylyl, etc. The charge stock compounds can suitably contain between four and 18 carbon atoms per molecule and preferably contain between six and 10 carbon atoms. Suitable charge stock compounds include the following without being limited, thereto, cyclohexanol, cyclohexanone, cyclohexenol, cyclohexenone, 1,3-cyclohexanediol, 1,4-cyclohexanediol, 1,3-cyclohexanedione, 1,4-cyclohexanedione, 4-methylcyclohexanone, 4-t.butylcyclohexanol, 3,5-dimethylcyclohexanone, 4-phenylcyclohexanone, 3-tolylcyclohexanone, cyclopentanol, cyclopentanone, 3-methylcyclopentanol, 2-ketotetralin, 2-(1-cyclohexenyl)cyclohexanone, 2,6-dicyclohexenylcyclohexanone, etc.

Inert diluents, such as aliphatic paraffins can be present in the charge stock, if desired, but their presence merely utilizes needed reactor space and reduces the space-time-yield of products. Unsaturated compounds, such as acetylenes, linear or branched olefins, and aromatic type compounds can be tolerated, but are undesirable as they may tend to polymerize, hydrogenate or adversely affect the equilibrium of the desired reaction.

The tin and Group VIII metals of the catalyst can either be unsupported or supported. If a support is employed, any solid inert material can be used which has poor cracking characteristics. Such materials are well known in the art and include low surface area silica, high surface area silica, low and high surface area aluminas, silica-aluminas which are treated as by steaming to reduce their cracking activity, magnesia, etc., and combinations of these materials. The surface area of the supported catalyst can vary from about 0.1 square meters per gram ($M.^2/g.$) to about 500 $M.^2/g.$ with a preferred surface area of about 0.2 $M.^2/g.$ to about 275 $M.^2/g.$ The unsupported catalyst can have a surface area from about 0.1 $M.^2/g.$ to about 50 $M.^2/g.$ and preferably from about 5 $M.^2/g.$ to about 20 $M.^2/g.$ The supported catalyst in the higher range of surface area is pyrophoric and for this reason adequate precaution must be exercised in its use.

As noted above, the catalyst of this invention comprises metallic tin and a Group VIII metal wherein the molar ratio of the Group VIII metal to tin is at least 1.7:1. Preferably substantially all of the Group VIII metal and tin are present in the catalyst in the catalytically active metallic state. Any of the Group VIII metal or tin which is present as a compound exclusive of intermetallic compound, such as the metal oxide, is inactive for the dehydrogenation reaction and essentially serves as a diluent of the active uncombined metals that are present. In a fully reduced catalyst substantially all of the Group VIII metal and tin are present in the metallic form with a portion of the Group VIII metal and substantially all of the tin present in the form of a Group VIII metal-tin alloy and the remaining portion of the Group VIII metal present as free non-alloyed metal, as determined by x-ray diffraction analysis and additionally, in the case of nickel-tin catalysts, by nickel extraction with carbon monoxide according to the Mond process. It has been determined that neither the Group VIII metal alone nor the Group VIII metal-tin alloy alone will function herein, rather it is essential that the catalyst contain a mixture of the Group VII metal and the Group VIII metal-tin alloy, as identified by X-ray diffraction analysis, in order to function in accordance with the disclosure herein. It has been found further that a catalyst comprising a Group VIII metal and tin, wherein the molar ratio of Group VIII metal to tin is less than 1.7:1, is substantially inactive for the production of the hydroxyaromatic compound because in this proportion of the metallic components there is essentially no free, non-alloyed Group VIII metal. The preferred molar ratio of the Group VIII metal to tin is between about 2:1 and about 8:1 with the most preferred ratio being about 2.5 to 1 because it is believed the ratio of free non-alloyed Group VIII metal to the alloy is at an optimum for the catalysis at this composition. The molar ratio can be as high as about 15:1, if desired.

By a Group VIII metal is meant iron, cobalt, nickel, ruthenium, rhodium, palladium, osmium, iridium, and platinum. The preferred Group VIII metal is nickel. It has also been found quite unexpectedly that a combination of nickel and platinum is better than nickel alone.

If a Group VIII metal is employed together with the tin on a support, then the amount of Group VIII metal can suitably be between 2 and 20 weight percent and is preferably between 8 and 14 weight percent. Smaller or larger amounts of the Group VIII metal can be employed, but to no specific advantage. If a support is employed, the amount of tin can vary between 2 and 30 weight percent, with preferred amounts between 5 and 15 weight percent.

The supported Group VIII metal-tin catalysts of this invention are adversely affected by the addition of certain agents, such as sodium sulfate and chromium when these agents are added individually. It has now been found quite surprisingly, that the catalysts of this invention are improved in activity, selectivity, and especially in aging characteristics by the addition of a combination of an alkali metal sulfate and chromium. In addition, it has been found that the activity, selectivity, and aging characteristics of a nickel-tin catalyst are unexpectedly still further improved by the addition of platinum.

In addition, again quite suprisingly, it has been found that while the supported Group VIII-tin catalysts are adversely affected by the addition of a combination of chromium and platinum, the unsupported Group VIII-tin catalysts are promoted.

Figure 1:
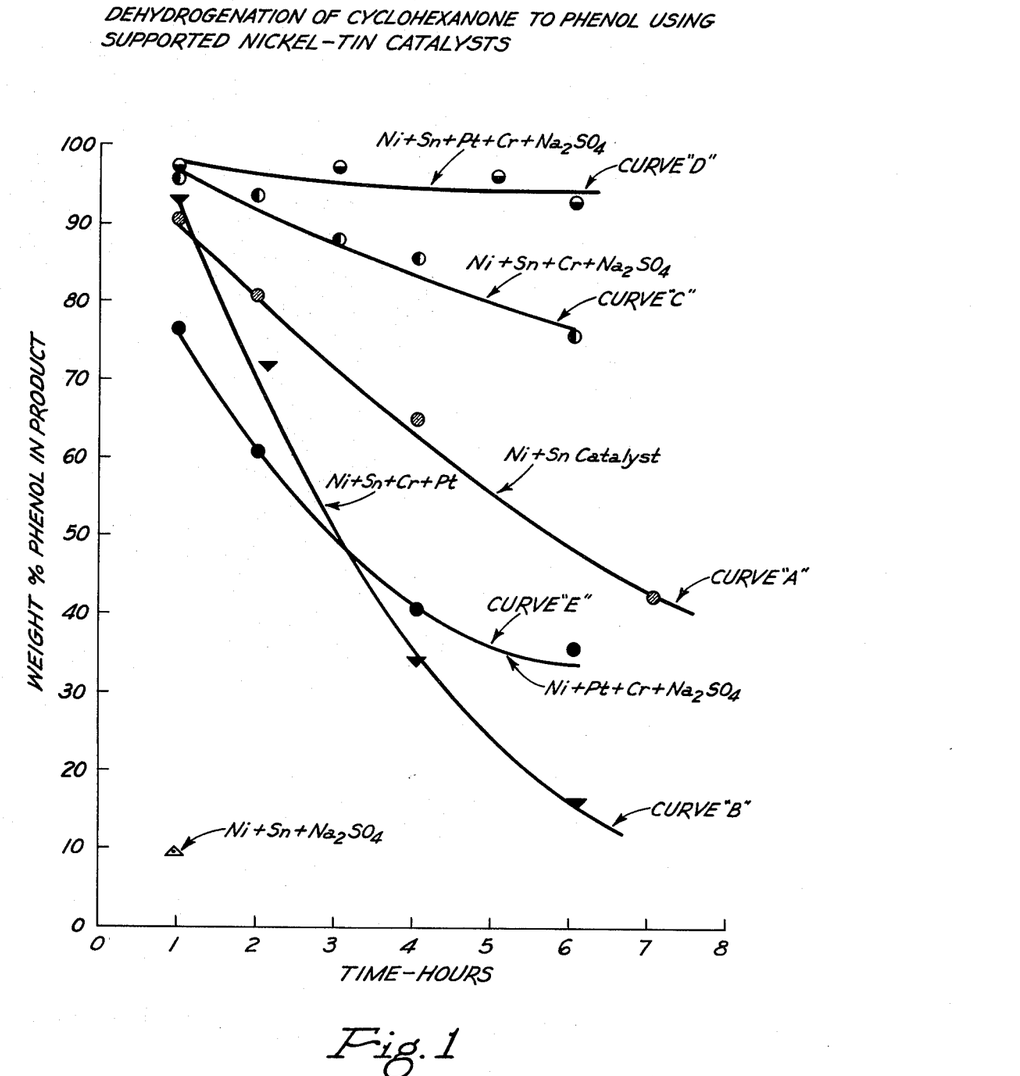
Figure 2:
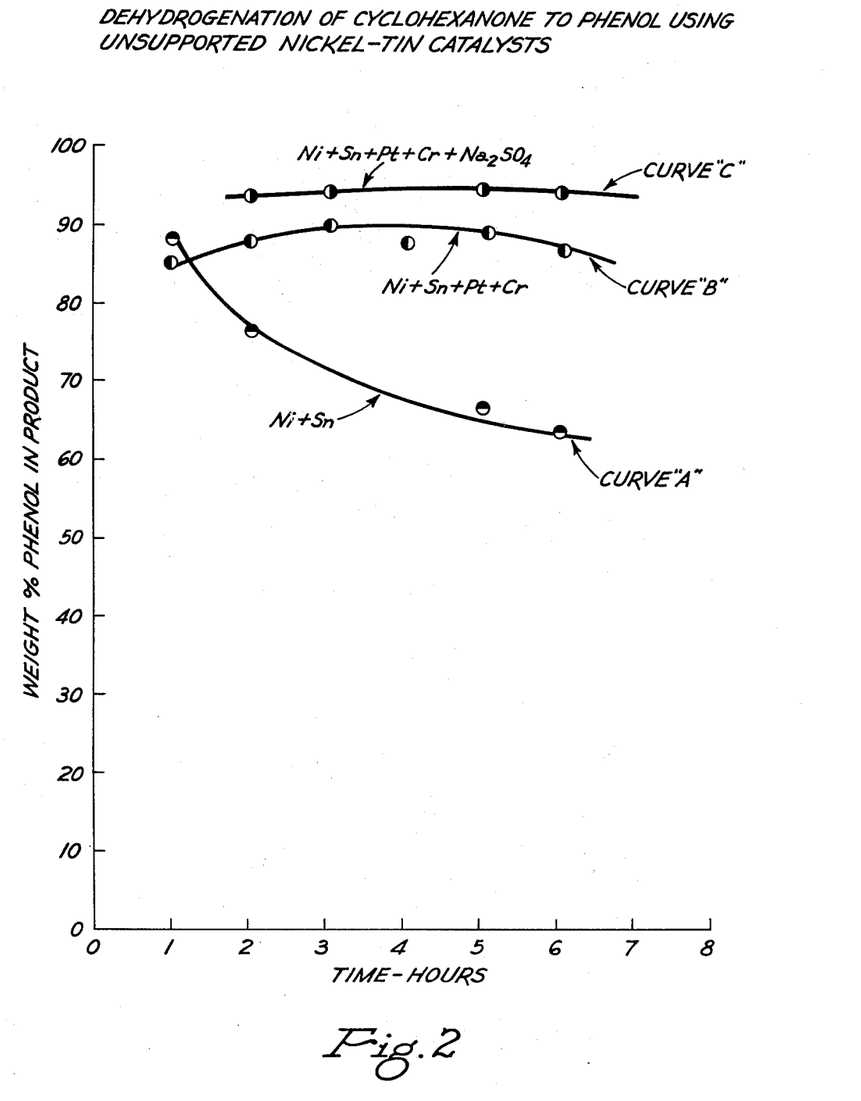

These results are summarized in FIGS. 1 and 2 attached,

FIG. 1 referring to the supported catalyst data and

FIG. 2 referring to the unsupported catalysts. The support used for the catalysts in FIG. 1 was a low surface area (less than 50 square meters per gram) silica obtained from Filtros Incorporated and designated by them as Filtros FS-140-L.

Referring to FIG. 1 attached:

Curve "A" shows that the activity of a supported nickel-tin (6:1 ratio ration of Ni:Sn) catalyst is initially very high (over 90 percent phenol from cyclohexanone the first hour) but diminishes rapidly, indicating poor aging characteristics;

The single point on FIG. 1 at 1 hour and 10 weight percent phenol in the product shows the effect of adding three parts of $Na_2SO_4$ to 100 parts of nickel on the curve "A" catalyst;

Curve "B" shows that the addition of 0.35 weight percent chromium and 0.18 weight percent platinum to the nickel-tin "A" curve catalyst has a deactivating effect and makes the catalyst age more rapidly.

Curve "C" shows that the addition of both sodium sulfate (3 parts per 100 parts of nickel) and 0.34 weight percent chromium has an unexpected beneficial effect on the activity and life of the nickel-tin catalyst; and Curve "D" shows that the further addition of 0.18 weight percent platinum to the chromium-sodium sulfate promoted curve "C" catalyst further increases the activity and further improves the aging characteristics of the nickel-tin catalyst.

That tin is an essential constituent of the catalyst of this invention is shown by curve "E" of FIG. 1 where the addition of 0.18 weight percent platinum, 0.35 weight percent chromium and 0.23 weight percent sodium sulfate to a supported 8.3 weight percent nickel catalyst did not result in the high conversions and excellent catalyst life achieved with the catalysts of this invention.

Referring to FIG. 2 attached:

Curve "A" shows that the activity of an unsupported nickel-tin catalyst is initially very high (about 88 percent), but diminishes rapidly, indicating poor aging characteristics;

Curve "B" shows that the addition of 0.18 weight percent platinum and 0.35 weight percent chromium greatly improves the aging characteristics of the catalyst, and this is contrary to the findings with the supported catalyst as shown by curve "B" in FIG. 1; and Curve "C" shows that the further addition of sodium sulfate (3 parts per 100 parts of nickel) further improves the activity and aging characteristics of the platinum-chromium promoted nickel-tin catalyst.

The alkali metal sulfate stabilizing and promoting agent used in the catalysts of this invention can be any of the alkali metal or alkaline earth metal sulfates, alone or in admixture. By an alkali or alkaline earth metal is meant sodium, potassium, rubidium, cesium, magnesium, calcium, barium, and strontium. The preferred alkali metal sulfates are sodium and potassium sulfates with sodium sulfate being the most preferred.

The weight ratio of alkali metal sulfate to Group VIII metal is usually between 0.3 and 10, with preferred weight ratios between 1.0 and 6.0. The most preferred weight ratios are between 2.5 and 6.0.

While it is not certain, it is believed that the alkali metal sulfate is present in the catalyst in the form of the sulfate, but a portion of the sulfate may be combined with the chromium and possibly with the platinum, and leaving a portion of the alkali metal in the form of its oxide.

The chromium stabilizing and promoting agent is probably present in the catalyst mostly in the form of its oxide, but, as noted, may be present at least in part in the form of chromium sulfate. The molar ratio of chromium (calculated as the metal) to Group VIII metal (calculated as the metal) can be between 0.1 and 6.0 with the preferred ratio between 0.5 and 4.0.

The platinum metal promoter and stabilizing agent is present probably mostly in the form of platinum metal, although some platinum oxide or sulfate may also be present. Any of the other noble metals of Group VIII can also suitably be used in place of platinum as a promoter stabilizing agent for the Group VIII iron group metal-tin catalysts of this invention. These noble metals include ruthenium, rhodium, palladium, osmium, iridium and platinum. The iron group metals include iron, cobalt and nickel. The amount of noble metal to employ as a promoter for the Group VIII iron group metal can vary between 0.05 and 20 parts by weight of noble metal per weight of Group VIII iron group metal, and is preferably between 0.5 and 6 parts by weight of noble metal with the most preferred amount being about 2 parts by weight of the noble metal per weight of iron group metal.

The dehydrogenation process using the catalyst of this invention, as noted above, is very simple in that a charge stock comprising, for example, cyclohexanol, cyclohexanone, or mixtures of these two is contracted with the catalyst under dehydrogenation conditions and the conversion of the cyclohexanone and cyclohexanol to phenol is in excess of 90 percent for extended periods of operation. Phenol is recovered from the reaction product by distillation. As noted above, phenol forms a constant boiling mixture with cyclohexanone, and this mixture can be recycled to the reaction zone for further conversion of the cyclohexanone, if desired.

The dehydrogenation conditions include an operating temperature between about 200° and 500° C. with a preferred temperature depending to large extent on the particular charge stock employed. For the production of phenol from cyclohexanone and cyclohexanol, or mixtures of the same, the preferred reaction temperatures are between about 250° and about 500° C. with more preferred reaction temperatures between about 300° and about 450° C. At temperatures above the preferred limits, efficiency and catalyst life are lowered and conversion suffers at temperatures below the preferred limits, that is, equilibrium favors the production of cyclohexanone and cyclohexanol from phenol. The catalysts of this invention function as dehydrogenation catalysts if the reaction conditions are such that from equilibrium considerations the unsaturated products are favored. That is, the conversion of cyclohexanol and cyclohexanone to phenol is favored at the higher temperatures and lower hydrogen pressures. The reaction pressure is therefore preferably atmospheric, or below, however, higher pressures can be used, for example, up to 50 p.s.i.g. or higher.

The liquid hourly space velocity or contact time is correlated with the reaction temperature, type of charge stock, and the specific catalyst employed. The liquid hourly space velocity is preferably low enough (contact time long enough) at any specific temperature to result in a concentration of phenol (or other desired hydroxyaromatic) in the product sufficiently high that it can easily be separated from the cyclohexanone (or other charge stock components) by distillation. Suitable liquid hourly space velocities are between about 0.05 and about 5, preferably between about 0.1 and about 2 Vol./Vol./Hr., with the higher space velocities being useful with the more active catalysts and higher temperature of operation.

The reaction described herein is either a gas phase reaction or a liquid phase reaction depending upon the boiling point of the reactant, the reaction temperature, and the reaction pressure. In either case the reactant gas or liquid is preferably flowed through the reactor either downflow or upflow in contact with the catalyst. Because of the low pressures, preferably atmospheric, and high temperatures employed, the cyclohexanone charge stock is in the vapor phase and is passed through the catalyst bed using hydrogen as the carrier gas. Although the use of hydrogen as a carrier gas is not critical, and the process can be run without it, the catalyst life is shortened if added hydrogen is not present in the gas stream. The molar ratio of hydrogen to the charge stock is suitably between about 1 and 15, and preferably between about 4 and 8 moles of hydrogen per mole of the cycloaliphatic feed material.

In another aspect of the subject invention, the method of preparing the tin-Group VIII metal catalyst has been found to be important for obtaining a catalyst having the best activity and aging characteristics for use in the process of this invention. In accordance with the invention, a tin-Group VIII metal catalyst which is especially active for the dehydrogenation of cycloaliphatic ketones and alcohols is produced by a process which comprises heating a solid intimate admixture of tin and Group VIII metal oxides to a temperature between about 250°, preferably about 300°, and 600° C. for a time of at least 5 hours in the presence of a gas containing free molecular oxygen followed by reduction to the metals in hydrogen at an elevated temperature.

The solid intimate admixture of a Group VIII metal and tin oxides can be an unsupported admixture obtained by any suitable procedure or an admixture of supported Group VIII metal and tin oxides prepared by any suitable procedure. For example, a Group VIII metal and tin hydroxide can be coprecipitated from an aqueous solution of nickel nitrate and tin chloride by the addition of sodium hydroxide or ammonium hydroxide, and the metal hydroxides converted to the metal oxides by heating.

If a supported catalyst is desired, one suitable procedure is to impregnate a support from an aqueous solution of a Group VIII metal and tin salts, such as nickel nitrate and tin chloride, and thereafter heating the catalyst for a time and at a temperature sufficient to decompose the metal salts to the desired oxides. Temperatures of about 500° C. and times of about 3 hours are usually employed to convert the metal salts to the oxide form.

Another suitable procedure is to add a dilute aqueous solution of sodium hydroxide to a Group VIII metal salt, e.g. $Ni(NO_3)_2.6H_2O$ and a tin salt, e.g. $SnCl_2.2H_2O$ to form a colloidal precipitate and then to impregnate a support, dry it and calcine it as above.

Still another suitable procedure is to admix a finely divided support with an intimate admixture of a Group VIII metal oxide, e.g. nickel oxide and tin oxide, heat the admixture in the presence of water, say at 90° C. for 6 hours, to prepare a past which can then be dried, calcined and pressed into pellets. Both the supported and the unsupported catalysts can be formed into pellets, extrudates etc., either preceding or following the reduction step.

Figure 3:
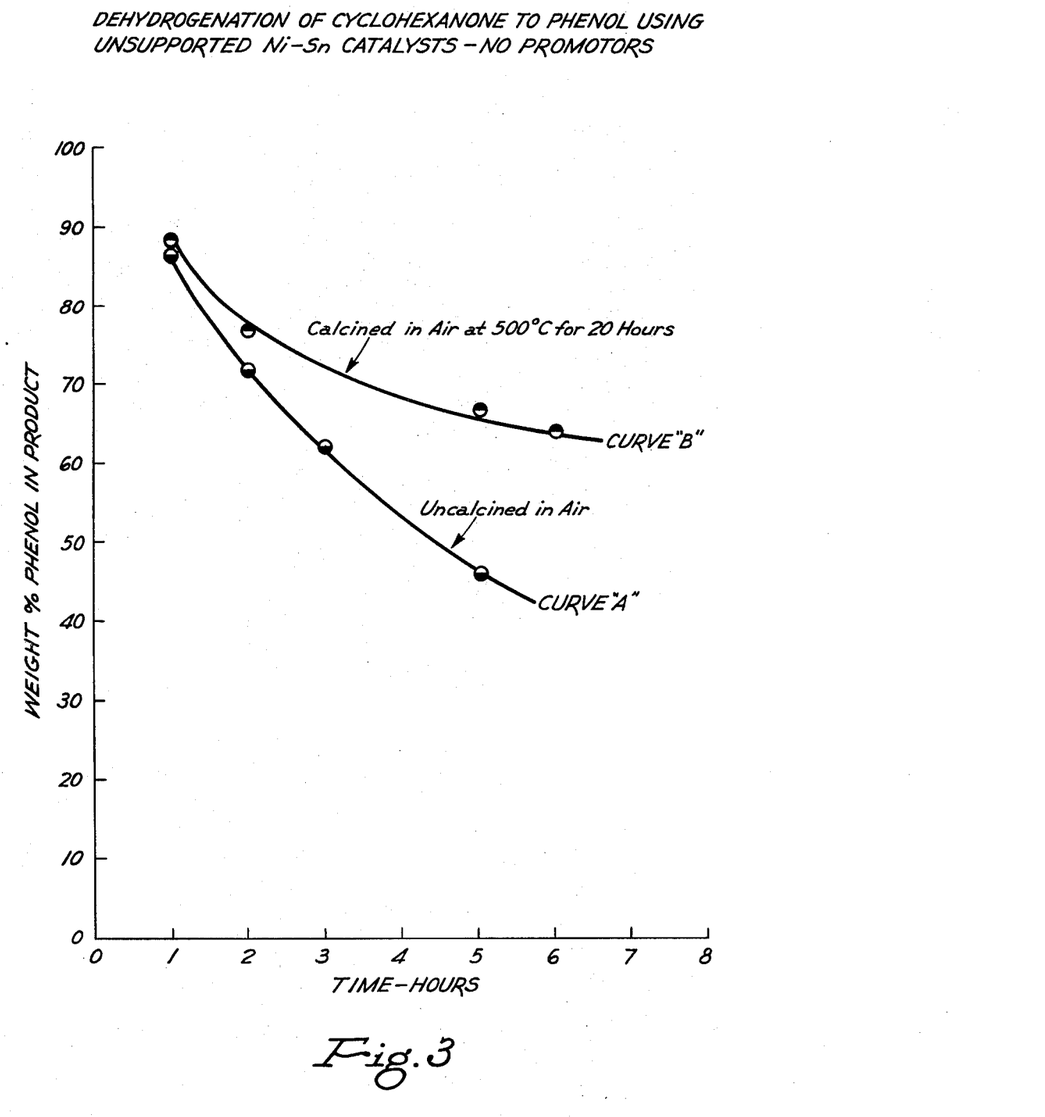

The catalysts comprising an intimate admixture of at least one Group VIII metal oxide, e.g. nickel oxide, and tin oxide, are next oxidized in the presence of a gas containing free molecular oxygen for a time greater than 5 hours and at a temperature in excess of 250°C. so that the resulting admixture of oxides on reduction with hydrogen results in a mixture of metals having increased activity for the production of phenol from cyclohexanone. That is, it has been found that the temperature of oxidation and the length of time of oxidation are important for obtaining Group VIII metal-tin catalysts which are the most active in the process of this invention. Group VIII metal-tin catalysts heated in air at 500° C. for 3 hours and then reduced in hydrogen have been found to be much less active than the same catalysts heated in air at 500° C. for 20 hours and then reduced in hydrogen. FIG. 3 attached shows data for an unsupported nickel-tin catalyst heated in air for different periods of time. Referring to FIG. 3, curve "A" represents the data for an unsupported nickel-tin catalyst heat treated in air at 110° C. for 20 hours. Curve "B" on FIG. 3 represents the data for the same unsupported nickel-tin catalyst heat treated in air at 500° C. for 20 hours. The added heat treatment (calcining) at 500° C. rather than 110° C. in the presence of air resulted in a catalyst after reduction having unexpectedly superior activity and aging characteristics. The gas containing free molecular oxygen can suitably have between 5 and 100 weight percent oxygen. Air, because of availability, is the preferred gas.

The catalysts after heat treating in the presence of air are preferably reduced with hydrogen to transform substantially all of the Group VIII metal and tin and also platinum, if present, to the metallic state. Suitable reduction conditions include passing hydrogen over the catalyst at temperatures of about 375° C. for about 3 hours. Since the reduction is a time-temperature function, these two variables must be correlated to obtain substantially complete reduction of the metals. The temperature must be at least about 250° C. and preferably about 300° C. and should be no higher than about 800° C., preferably 550° C. The catalyst can be added to the reaction zone and be reduced in a hydrogen stream prior to addition of the reactant gas or it can be reduced at the conditions of reaction, for the reaction conditions include an elevated temperature and the presence of hydrogen which is normally added as a carrier gas. It is preferred to reduce the catalyst prior to its contact with the reactant charge stream.

It is observed that the extended oxidation treatment followed by the reduction step results in a catalyst which is more active in promoting the subject reaction. In any event, it can be seen from the above results that the most active nickel-tin catalysts are those where the intimate admixture of nickel and tin oxides are heated in the presence of a gas containing free molecular oxygen for a period of at leas 5 hours, preferably 10 to 30 hours, at a temperature of at least 250° C., preferably between 350° and 500° C., but the temperature should not exceed about 600° C. Longer heating times can be used, say to 50 or 100 hours, but to no added purpose.

It has also been found that the type of Group VIII metal salt employed in the preparation of impregnated catalysts is important for obtaining the most active catalysts. It is preferred to avoid the use of Group VIII metal halide salts, if possible, in the preparation of the supported catalysts of this invention, especially catalysts having the higher molar ratios of Group VIII metal to tin.

The Iron Group (Fe, Co and Ni) metal nitrates and iron group organo metallics, such as acetates, carbonates and benzoates, are preferred. It is difficult to obtain soluble slats of palladium, osmium, iridium and platinum other than the halides, but non-halide salts, such as diamminepalladium (II) hydroxide $[Pd(NH_3)_2(OH)_2]$ are preferred, if available.

The preferred salts for preparing supported catalysts by impregnation include, but are not limited to, ferrous acetate, ferric nitrate, cobaltous acetate, cobaltous benzoate, cobaltous nitrate, nickel acetate, nickel nitrate, ruthenium acetate, ruthenium carbonate, ruthenium acid carbonate, ruthenium nitrate, rhodium nitrate, and diamminepalladium (II) hydroxide. Other salts, such as for example, $PdCl_2$; $PdCl_2.2H_2O$; $OsCl_2$; $OsCl_3$; $OsCl_3.3H_2O$; $PtCl_4$; $PtCl_4.5H_2O$; $IrBr_3.4H_2O$; and $IrCl_2$ can also be used, and they may be the only soluble salts of the desired metal available for impregnation of a support.

In addition, it has been found that hydrogen sulfide has a very detrimental effect on the dehydrogenation process, and it is therefore preferred to avoid the use of metal salts containing sulfur to prepare the catalysts of this invention. Likewise, the charge stock should be relatively free of sulfur and sulfur containing materials.

Any tin salt can be used to prepare the supported catalysts. It is preferred to use those tin salts which can be conveniently dissolved or dispersed in an organic or inorganic solvent, e.g. dimethylformamide or water. Suitable tin salts include, but are not limited to, the tin halides, such as stannic chloride, stannic bromide, stannous chloride and organo tin salts, such as stannous acetate, stannous oxalate, dicyclopentadienyl tin (II) and dibenzyldiethylstannane.

The catalyst does eventually lose activity during use. However, the activity can be restored substantially completely by oxidative regeneration followed by reduction in hydrogen. Catalysts have been regenerated by heating in the presence of air at 400° C. while controlling the temperature by dilution with nitrogen. Temperatures as low as 300° C. can suitably be employed. The temperature during the oxidative regeneration step should not exceed 600° C. The time and temperature of regeneration should be such that the catalyst on reduction regains substantially all of its original activity. The reduction step is conducted in hydrogen at the same conditions as utilized for preparing the original catalyst.

The invention will be further described with reference to the following experimental work.

A series of supported catalysts were prepared using varying amounts of nickel and tin as shown in Table I below:

TABLE I

| Catalyst No. | Wt.% Ni | Wt.% Sn | Ni/Sn Molar Ratio | BET[1] Surface Area m²/gm. |
|---|---|---|---|---|
| 1 | 12 | 0 | ∞ | 246.7 |
| 2 | 8.3 | 3.7 | 4.5 | 237.7 |
| 3 | 8.7 | 7.1 | 2.5 | 242.7 |
| 4 | 6.6 | 14.2 | 0.9 | 209.4 |

1 - using a nitrogen adsorbent

The support used for all of the catalysts in Table I was a high surface area silica sold by the Davison Chemical Company under the trade name Davison Grade 70 and found to have a BET surface area using a nitrogen adsorbent of 261.4 square meters per gram. The catalysts were prepared by impregnating the silica support with an aqueous solution of proper concentration of nickel nitrate and tin chloride $SnCl_2 \cdot 2H_2O$) to the point of incipient wetness. The catalysts were dried at 110° C. for 20 hours; thereafter calcined in air at 500° C. for 20 hours; and finally reduced in hydrogen at 375° C. for 3 hours.

Each of these catalysts, 1 through 4, was subjected to carbon monoxide in accordance with the Mond process to remove nonalloyed metallic nickel from the catalyst. Dried carbon monoxide was passed over a sample of each reduced catalyst for 6 hours at 80° C. and a gas hourly space velocity of approximately 300. The volatile nickel carbonyl which was formed was swept out of the sample tube and decomposed to nickel and carbon monoxide at 300° C. in another tube. The amount of nickel removed from each catalyst is set forth in Table II.

TABLE II

| Catalyst No. | Nickel,% | Tin,% | Nickel Removed,% |
|---|---|---|---|
| 1 | 12 | 0 | 95–100 |
| 2 | 8.3 | 3.7 | 29 |
| 3 | 8.7 | 7.1 | 15 |
| 4 | 6.6 | 14.2 | 0 |

This provides an indication of the amount of free metallic nickel present in each catalyst and the amount of nickel alloyed with tin.

Catalysts 1 through 4 were used in Examples 1 through 4 below to test their activity for the conversion of cyclohexanone to phenol after one hour of operation. The runs for Examples 1 through 4 were made at 375° C., atmospheric pressure, and using a liquid hourly space velocity of cyclohexanone of 1.4 Vol./Vol./Hr. Hydrogen was used as the carrier gas. The results are summarized in Table III below.

TABLE III

| Example No. | Ni/Sn | % Conversion of Cyclohexanone | % Selectivity to Phenol |
|---|---|---|---|
| 1 | ∞ | 33.6 | 81.5 |
| 2 | 4.5 | 97.9 | 96.1 |
| 3 | 2.5 | 98.5 | 98.0 |
| 4 | 0.9 | 16.0 | 6.0 |

Referring to Table III, Example 1 using the supported nickel catalyst with no tin gave a conversion and selectivity completely unacceptable as the phenol could not successfully be separated from the unconverted cyclohexanone. In like manner, catalyst 4 wherein the molar ratio of nickel to tin was 0.9:1 gave very little conversion and practically no selectivity to the production of phenol. This result was very surprising since catalysts 2 and 3 wherein the molar ratio of nickel to tin was 4.5 and 2.5 respectively, gave practically quantitative conversion of cyclohexanone with almost 100 percent selectivity to the production of phenol. The data in TaBle III above show that the use of nickel alone (Example) 1) results in a very poor dehydrogenation catalyst for cyclohexanone and they show that tin is an essential constituent of the catalyst in the proper proportion for use in the process of this invention (Examples 2 and 3).

The runs for Examples 1 through 4 were continued for as long as 7 hours with the products being monitored to determine conversion and efficiency. The yield of phenol was determined by multiplying conversion by efficiency and these results were shown on FIG. 4.

Figure 4:
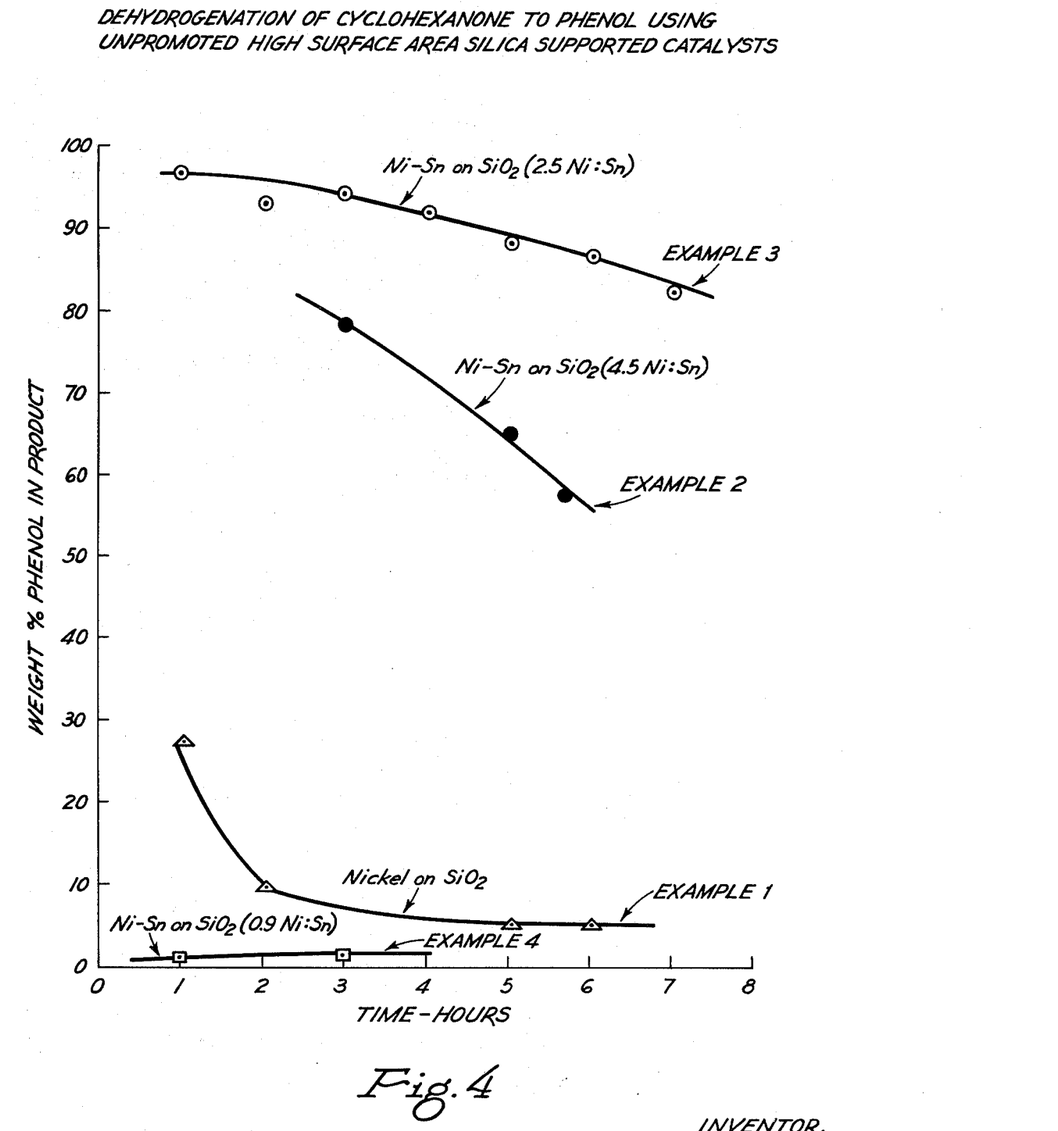

Referring to FIG. 4, the curve for Example 1 shows the yield of phenol drops off very rapidly for the nickel catalyst. The use of a nickel-tin catalyst wherein the nickel-tin molar ratio was 0.9:1 (Example 4) gives negligible yields of phenol while the higher nickel-tin ratio catalyst (Example 2) also results in a rapid drop off of yield. The nickel-tin catalyst wherein the molar ratio of nickel to tin is 2.5 (Example 3) maintains the yield of phenol at a fairly high level indicating that the optimum nickel to tin ratio is about 2.5:1.

A second series of catalysts, 5 through 11, were prepared using a low surface area (0.2 m²/gm.) silica sold under the trade name Filtros FS-140-L by Filtros Incorporated. The silica was impregnated with an aqueous solution of nickel nitrate, $Ni(NO_3)_2 \cdot 6H_2O$, and stannous chloride, $SnCl_2 \cdot 2H_2O$, to the point of incipient wetness. The catalyst was then dried at 110°–120° C. for 3 hours and then calcined in air at 500° C. for either 3 or 20 hours. The catalysts were then reduced with hydrogen at 375° C. for 3 hours.

Sodium was added to the impregnating solutions used to prepare some of the catalysts (7 through 9). The sodium was added in the form of either a dilute aqueous solution of sodium hydroxide or sodium sulfate. When the dilute aqueous solution of sodium hydroxide was added to the aqueous solution of nickel nitrate and tin chloride, a light green precipitate formed which was colloidal in nature and remained suspended in solution. The silica was then impregnated with the suspended precipitate, dried, calcined in air, and reduced as described above.

The catalysts were finally tested for their activity in Examples 5 through 11 for the conversion of cyclohexanone to phenol after 1 hour of operation by the same procedure and under the same conditions as in Examples 1 through 4 above.

The results are shown in Table IV below.

TABLE IV

| Ex. and catalyst No. | Wt.% Ni | Wt.% Sn | Ni/Sn molar ratio | Treated with | Calcined in air, hours | Wt.% Conversion | % Selectivity to Phenol |
|---|---|---|---|---|---|---|---|
| 5 | 8.15 | 2.24 | 6.0 | — | 3 | 79.8 | 96.9 |
| 6 | 8.15 | 2.24 | 6.0 | — | 20 | 92.8 | 96.3 |
| 7 | 8.15 | 2.24 | 6.0 | NaOH | 3 | 78.0 | 96.4 |
| 8 | 8.15 | 2.24 | 6.0 | NaOH | 20 | 91.0 | 95.2 |
| 9 | 8.15 | 2.24 | 6.0 | $Na_2SO_4$ | 20 | 11.9 | 86.4 |
| 10 | 9.00 | 2.22 | 8.0 | — | 20 | 77.5 | 97.9 |
| 11 | 8.13 | 6.80 | 1.8 | — | 20 | 10.7 | 76.7 |

Referring to Table IV, a comparison of Examples 5 and 6 shows the importance of calcining in air for an extended period of time, calcining for 3 hours giving only 79.8 percent conversion while a catalyst calcined for 20 hours results in a conversion of 92.8 weight percent.

That the addition of sodium hydroxide to the impregnated solution has no detrimental effect is shown by a comparison of Examples 7 and 8 with Examples 5 and 6 respectively, where substantially the same results were obtained for like calcined-in-air catalysts.

The addition of three weight percent sodium sulfate based on the nickel is detrimental, as shown by a comparison of Examples 6 and 9 where conversion dropped drastically from 92.8 to 11.9 percent merely by adding the sodium sulfate.

A comparison of Examples 6, 10 and 11 shows the effect of varying the nickel to tin molar ratio on the activity of the catalyst. A molar ratio of 6 (Example 6) gives excellent results while a ratio of 8 (Example 10) reduced conversion to 77.5 percent and a ratio of 1.8 results in a reduction in conversion to 10.7 percent while maintaining a reasonable selectivity to phenol production.

A comparison of Examples 4 and 11 shows that when the Ni:Sn ratio is reduced from 1.8:1 (Example 11) to 0.9:1 (Example 4) the selectivity to phenol production drops from 76.7 percent to 6 percent, thus showing that the molar ratio of nickel (Group VIII metal) to tin should be at least 1.7:1, and is preferably at least 2:1 for good conversion and selectivity to the production of phenol.

Example 6 was repeated except the run was continued for 7 hours. The results are shown on curve "A" of FIG. 1 and, as discussed above, the aging characteristics of this catalyst were not as good as desired.

Figure 5:
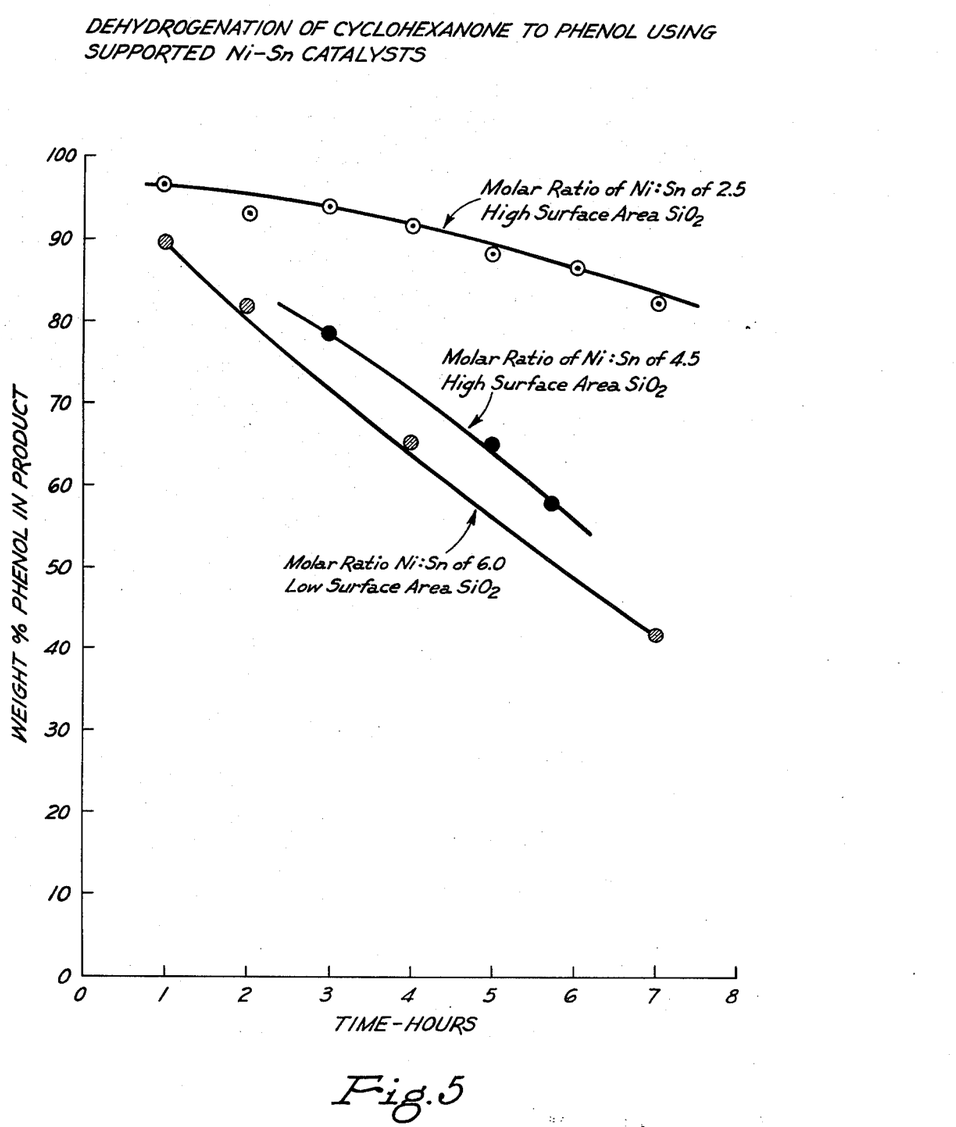

These results are in substantial agreement with the results shown in FIG. 4 where the nickel to tin catalyst having the higher nickel to tin ratio (4.5:1 — Example 2 curve) showed much poorer aging characteristics than the 2.5 molar nickel to tin catalyst (Example 3 curve). If the Examples 2 and 3 curves of FIG. 4 and curve "A" of FIG. 1 are plotted together as is done on FIG. 5, it can readily be seen that as the nickel to tin ratio increases, the aging characteristics deteriorate. This further demonstrates that the optimum nickel to tin molar ratio is about 2.5:1.

It has also been found — as shown on FIG. 1 discussed above — that the addition of certain combinations of stabilizing agents, exemplified by chromium and sodium sulfate, serves to increase the activity and improve the aging characteristics of the supported nickel-tin catalyst. The addition of either chromium or sodium sulfate alone is detrimental while quite unexpectedly, the addition of both is beneficial. The addition of platinum to the chromium-sodium sulfate promoted catalysts confers still further benefits on the catalyst as shown by curve "D" on FIG. 1. All of the catalysts shown on FIG. 1 were prepared by the procedure used to prepare catalyst 6 above. The chromium and platinum promoters were added to the impregnating solution in the forms of chromium nitrate, $Cr(NO_3)_3 \cdot 9H_2O$ and 10 percent chloroplatinic acid respectively, but other soluble salts of chromium and platinum can be used or other methods of addition, such as separate addition of chromium and platinum, can be employed, if desired.

EXAMPLE 12

To further illustrate the invention, cyclohexanone was passed downflow in the vapor phase at atmospheric pressure and at 375° C. in a stream of hydrogen (hydrogen to cyclohexanone mole ratio of 6.2) through a bed of a nickel-tin promoted catalyst at a liquid hourly space velocity of 0.2 based on the cyclohexanone. The catalyst was prepared in accordance with the procedure of Example 6 above; and used the same low surface area silica support. The chromium and platinum promoters were added to the impregnating solution in the form of chromium nitrate $(Cr(NO_3)_2 \cdot 9H_2O)$ and a 10 percent chloroplatinic acid solution. Sufficient amounts of the chromium salt and platinum solution plus $Na_2SO_4$ were added to the aqueous solution of nickel nitrate $(Ni(NO_3)_2 \cdot 6H_2O)$ and $SnCl_2 \cdot 2H_2O$ so that the final catalyst has 2.6 weight percent tin; 8.1 weight percent nickel; 0.34 weight percent chromium; 0.18 weight percent platinum and 0.22 weight percent sodium sulfate. The nickel-tin molar ratio was 6. The run was continued for 224 hours, during which time the conversion of cyclohexanone was 98–99 mole percent with an efficiency to the production of phenol of 98–99.5 mole percent.

The run was extended to 336 hours, at which time the conversion has decreased to 88.4 mole percent, but the average conversion over the entire 336-hour run was 96.8 mole percent with an average efficiency of 98.86 percent. The total throughput was 77.89 Vol./Vol. of catalyst or 13.84 bbl./ft.$^3$. The weight balance over the run was 97.8 weight percent. The catalyst was regenerated by by controlled burning as described above. The conversion and efficiency after 160 hours using the regenerated catalyst was 97.45 mole percent and 98.82 mole percent respectively.

EXAMPLE 13

To further illustrate the superior performance of a nickel-tin catalyst the following experiment was carried out. 70 grams of 10–20 mesh Davison Grade 70 silica gel was impregnated to the point of incipient wetness with a solution containing 29.6 grams of Ni(NO$_3$)$_2$·6H$_2$O, 9.1 grams of SnCl$_2$·2H$_2$O, 0.7 grams of Cr(NO$_3$)$_3$·9H$_2$O, 3.5 cc. of 10 percent chloroplatinic acid, and 0.175 grams of Na$_2$SO$_4$. After drying at 110° C. for 20 hours and calcining in air at 500° C. for 20 hours, the catalyst was reimpregnated with a solution of 0.175 grams of Na$_2$SO$_4$ in 70 cc. of water and calcined an additional 2 hours at 500° C. The catalyst had a surface area of 240 M.$^2$/g.

68 ml. of this catalyst were placed in an externally heated stainless steel reactor having an internal diameter of ¾ inch and 30 inches long. Hydrogen gas was flowed through the catalyst at a GHSV of 300 and temperature of 375° C. for 3 hours. Table 5 gives the data obtained from an x-ray diffraction analysis of this reduced catalyst. This demonstrates the existence of a nickel phase and a separate nickel-tin alloy phase. The temperature of the catalyst was held at 375° C. and a stream of vaporized cyclohexanone was introduced into the hydrogen stream to form a 6 to 1 molar ratio of hydrogen to cyclohexanone and this mixed stream passed (downflow) through the catalyst bed at a cyclohexanone liquid hourly space velocity of 0.2. The initial conversion of the cyclohexanone was 97 percent with a selectivity of 97 percent to phenol and a yield to phenol of 94 percent. The unit was run continuously at these conditions with the conversion and yield remaining constant after 2,010 hours of continuous operation. After and additional 30 hours of running, the conversion dropped to 95 percent while the selectivity remained constant at 97 percent.

At this point the catalyst was regenerated to its original activity by heating in air at 375° C. for 2 hours and by reducing in hydrogen at 375° C. for 3 hours. The reaction was repeated at the same conditions used in the first cycle resulting in 97 percent conversion and selectivity with an overall yield of 94 percent phenol.

TABLE V

X-ray Diffraction Lines of the Reduced Nickel-Tin Silica Catalyst

| Observed | | Nickel-Tin Alloy[a] | | Nickel Metal[b] | |
|---|---|---|---|---|---|
| d(A) | I | d(A) | I | d(A) | I |
| 2.92 | M | 2.92 | 80 | | |
| 2.59 | W | 2.61 | 10 | | |
| 2.29 | VW | | | | |
| 2.16 | W | | | | |
| 2.10 | M | 2.09 | 100 | | |
| 2.03 | M | 2.03 | 100 | 2.034 | 100 |
| 1.866 | VW | | | | |
| 1.765 | W | | | 1.762 | 42 |
| 1.672 | VW | 1.67 | 50 | | |
| 1.610 | VW | 1.60 | 50 | | |
| 1.552 | VW | 1.55 | 50 | | |
| 1.467 | W | 1.46 | 60 | | |
| 1.281 | VW | 1.29 | 50 | | |
| 1.246 | W | | | 1.246 | 21 |
| 1.191 | VW | 1.19 | 70 | | |
| 1.167 | VW | 1.18 | 40 | | |
| 1.098 | VW | 1.09 | 80 | | |
| 1.064 | W | | | 1.062 | 20 |

(a) ASTM Card (3–1004)
(b) ASTM Card (4–0850)
I — Intensity
M — Medium
W — Weak
VW — Very Weak

EXAMPLE 14

The precipitates formed by adding ammonium hydroxide to a water solution of nickel nitrate and by adding stannous chloride to water were thoroughly mixed, dried at 110° C. for 16 hours, calcined in air at 500° C. for 20 hours, and reduced in hydrogen at 375° C. for 3 hours. The resulting unsupported nickel-tin catalyst had a surface area of 6 M.$^2$/g. and a nickel to tin molar ratio of 3 to 1.

2 grams of this catalyst were mixed with quartz chips to form a catalyst bed volume in the reactor of 12 cc. A bed temperature of 375° C. was maintained as a 50:50 volume mixture of 2-(1-cyclohexenyl) cyclohexanone and benzene was passed over the catalyst at a liquid flow of 0.5 cc./min. using hydrogen as a carrier in a molar ratio of about 3 moles of hydrogen per mole of 2-(1-cyclohexenyl)-cyclohexanone. The conversion by analysis was about 50 percent with a selectivity of 90 percent to o-phenylphenol.

In like manner cyclohexenol and cyclohexenone are dehydrogenated to phenol; 1,3-cyclohexanedione and 1,3-cyclohexanediol are converted to resorcinol; 1,4-cyclohexanedione and 1,4-cyclohexanediol are converted to hydroquinone; 4-methylcyclohexanone is converted to p-cresol; 4-t.butylcyclohexanol is converted to 4-t.butylphenol; 3,5-dimethylcyclohexanone is dehydrogenated to 3,5-dimethylphenol; and 4-phenylcyclohexanone is converted to 4-phenylphenol. Also, in like manner 3-tolylcyclohexanone is converted to 3-tolylphenol; cyclopentanol and cyclopentanone are dehydrogenated to cyclopentadienol; 3-methylcyclopentanol is converted to 3-methylcyclopentadienol; 2-ketotetralin is converted to α-naphthol; 2,6-dicyclohexenylcyclohexanone is converted to 2,6-diphenylphenol, etc.

The above data illustrate the catalysts of this invention have an exceptionally high activity, have extremely long life and are easily regenerable to their original activity.

Resort may be had to such variations and modifications as fall within the spirit of the invention and the scope of the appended claims.

I claim:
1. A catalyst consisting essentially of a metallic Group VIII metal and metallic tin in a molar ratio of about 1.7 to about 15 moles of Group VIII metal per mole of tin, a portion of said metallic Group VIII metal being present as free metal and the remainder of said metallic Group VIII metal being present in a Group

VIII metal-tin alloy and substantially all of said metallic tin being present in said Group VIII metal-tin alloy, and said catalyst having a surface area of at least about 0.1 square meters per gram.

2. A catalyst in accordance with claim 1 in which from about 2 moles to about 8 moles of Group VIII metal are present for every mol of tin.

3. A catalyst in accordance with claim 1 which comprises from about 2 to 20 weight percent Group VIII metal and from about 2 to 30 weight percent tin on an inert support.

4. A catalyst in accordance with claim 2 in which said Group VIII metal is nickel.

5. A catalyst in accordance with claim 1 which contains from about 0.1 to about 6.0 moles of chromium oxide calculated as the metal per mole of Group VIII metal and from about 0.3 to about 10 parts by weight of an alkali metal sulfate per part by weight of Group VIII metal.

6. A catalyst in accordance with claim 5 in which the Group VIII metal is nickel and which contains from about 0.05 to about 20 parts by weight of a noble metal per part by weight nickel.

7. A catalyst in accordance with claim 3 in which said Group VIII metal is nickel and which contains from about 2 moles to about 8 moles of nickel per mole of tin, from about 0.5 to about 4 moles of chromium oxide calculated as the metal per mole of nickel, from about 0.5 to about 6 parts by weight platinum per part by weight nickel, and from about 1 to about 6 parts by weight sodium sulfate per part by weight nickel.

8. A catalyst in accordance with claim 1 in which substantially all of said Group VIII metal and tin is in the metallic form.

9. A catalyst in accordance with claim 4 in which the molar ratio of nickel to tin is about 2.5.

10. A method for producing the catalyst of claim 1 which comprises heating a solid intimate admixture of a reducible tin compound and at least one reducible Group VIII metal compound wherein the molar ratio of the Group VIII metal to tin is at least about 1.7 to a temperature between about 250° and about 600° C. for a time of at least about 5 hours in the presence of gas containing free molecular oxygen and then heating the oxygen-treated admixture with hydrogen at an elevated temperature for the reduction of the metals to the metallic state.

11. A method according to claim 10 wherein the solid intimate admixture of reducible tin compound and at least one reducible Group VIII metal compound is deposited on an inert support from a solution of metal salts.

12. A method according to claim 10 wherein at least one of the Group VIII metal salts is selected from the iron group metals of Group VIII, and at least one of the Group VIII metal salts is selected from the noble metals of Group VIII.

13. A method according to claim 10 wherein the Group VIII metal is nickel.

* * * * *